United States Patent
Chen et al.

(10) Patent No.: US 11,823,306 B2
(45) Date of Patent: Nov. 21, 2023

(54) VIRTUAL IMAGE GENERATION METHOD AND APPARATUS, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Ruizhi Chen, Beijing (CN); Chen Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 40 days.

(21) Appl. No.: 17/658,514

(22) Filed: Apr. 8, 2022

(65) Prior Publication Data
US 2023/0021161 A1 Jan. 19, 2023

(30) Foreign Application Priority Data
Jul. 14, 2021 (CN) .......................... 202110796225.2

(51) Int. Cl.
G06T 11/00 (2006.01)
G06V 40/16 (2022.01)
G06V 10/54 (2022.01)

(52) U.S. Cl.
CPC ............ G06T 11/001 (2013.01); G06V 10/54 (2022.01); G06V 40/168 (2022.01)

(58) Field of Classification Search
CPC ... G06T 11/001; G06T 19/20; G06T 2200/08; G06T 17/00; G06T 17/20; G06V 40/168; G06V 10/54; G06V 40/16; G06V 40/161
See application file for complete search history.

(56) References Cited

U.S. PATENT DOCUMENTS

2013/0201187 A1* 8/2013 Tong .................... G06V 40/172
345/420
2015/0310673 A1* 10/2015 Romdhani .............. G06T 17/10
345/420

(Continued)

FOREIGN PATENT DOCUMENTS

CN 111354079 A 6/2020
CN 111369428 A 7/2020

(Continued)

OTHER PUBLICATIONS

Notice of Allowance for CN202110796225.2 dated May 25, 2022, 3 pgs.

(Continued)

*Primary Examiner* — Antonio A Caschera
(74) *Attorney, Agent, or Firm* — Kwan & Olynick LLP

(57) ABSTRACT

A virtual image generation method and apparatus, an electronic device and a storage medium which relates to the field of artificial intelligence technologies such as augmented reality, computer vision and deep learning. A specific implementation scheme involves: acquiring base coefficients corresponding to key points of a target face based on a target face picture; generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face.

20 Claims, 6 Drawing Sheets

(56) References Cited

U.S. PATENT DOCUMENTS

2019/0347826 A1   11/2019   Zhang et al.
2021/0104086 A1    4/2021   Wang et al.
2021/0375042 A1*  12/2021   Chen ..................... G06T 15/04

FOREIGN PATENT DOCUMENTS

| CN | 111695471 A | 9/2020 |
| CN | 111696029 A | 9/2020 |
| IN | 112634416 A | 4/2021 |
| IN | 112862934 A | 5/2021 |
| KR | 20160092364 A | 8/2016 |

OTHER PUBLICATIONS

Chenlei LV, et al., 3D Facial Expression Modeling Based on Facial Landmarks in Single Image, Neurocomputing 355 (2019) 155-167.
Chinese Office Action dated Mar. 23, 2022 For Chinese Application No. 2022110796225.2, 7 Pages.
Sihou Zhang, et al., Detailed 3D Human Body Reconstruction From a Single Image Based on Mesh Deformation, accepted Jan. 3, 2021, date of publication Jan. 6, 2021, date of current version Jan. 14, 2021, Digital Object Identifier 10.1109/Access.2021.3049548.

* cited by examiner

VIRTUAL IMAGE GENERATION METHOD AND APPARATUS, ELECTRONIC DEVICE AND STORAGE MEDIUM

The present application claims the priority of Chinese Patent Application No. 202110796225.2, filed on Jul. 14, 2021, with the title of "VIRTUAL IMAGE GENERATION METHOD AND APPARATUS, ELECTRONIC DEVICE AND STORAGE MEDIUM". The disclosure of the above application is incorporated herein by reference in its entirety.

FIELD OF THE DISCLOSURE

The present disclosure relates to the field of computer technologies, specifically to the field of artificial intelligence technologies, such as augmented reality, computer vision and deep learning, and, in particular, to a virtual image generation method and apparatus, an electronic device and a storage medium.

BACKGROUND OF THE DISCLOSURE

As the content of people's lives is gradually digitized and virtualized and concepts, such as metameres and digital twin, enjoy popular support, demands for virtual reality and augmented reality applications are bound to explode.

Personalized production of a virtual image, as an important agent form of human beings in the digital world, still mainly depends on designer customization. Generally, it costs tens of thousands of dollars to produce a low-quality, life-like agent model, and even more to customize a high-precision model, typically around 1 million dollars.

SUMMARY OF THE DISCLOSURE

The present disclosure provides a virtual image generation method and apparatus, an electronic device and a storage medium.

According to one aspect of the present disclosure, a virtual image generation method is provided, wherein the method includes:

acquiring base coefficients corresponding to key points of a target face based on a target face picture;

generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face.

According to another aspect of the present disclosure, there is provided an electronic device, including:

at least one processor; and a memory communicatively connected with the at least one processor;

wherein the memory stores instructions executable by the at least one processor, and the instructions are executed by the at least one processor to enable the at least one processor to perform a virtual image generation method, wherein the virtual image generation method includes:

acquiring base coefficients corresponding to key points of a target face based on a target face picture;

generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face.

According to still another aspect of the present disclosure, there is provided a non-transitory computer readable storage medium with computer instructions stored thereon, wherein the computer instructions are used for causing a computer to perform a virtual image generation method, wherein the virtual image generation method includes:

acquiring base coefficients corresponding to key points of a target face based on a target face picture;

generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The drawings are intended to provide a better understanding of the solutions and do not constitute limitations on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, Personal Digital Assistants (PDAs), wireless handheld devices, and Tablet Computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

Figure 1:
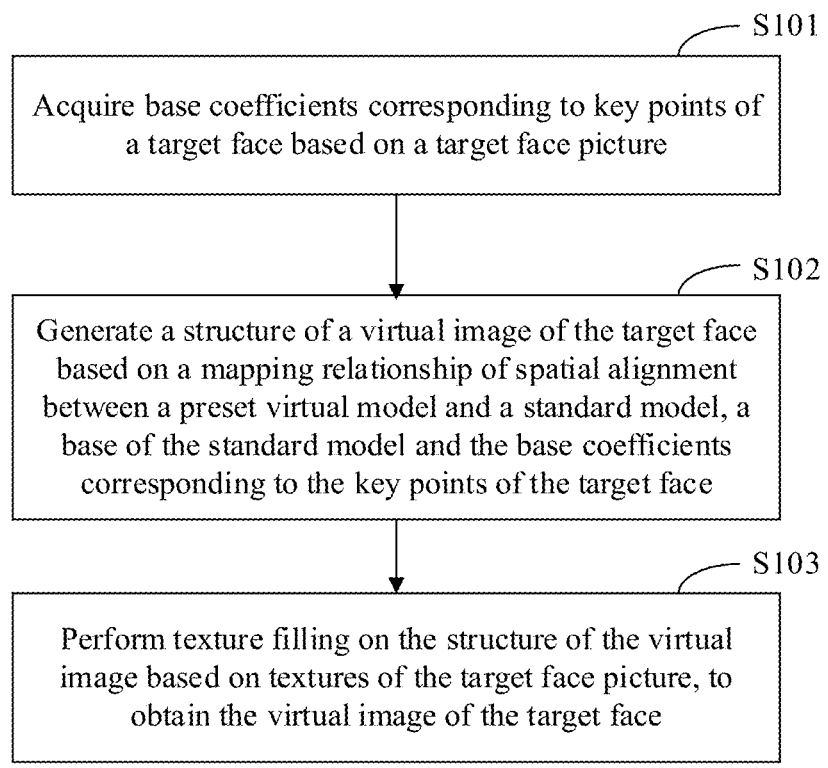
FIG. 1 is a schematic diagram according to a first embodiment of the present disclosure.

FIG. 1 is a schematic diagram according to a first embodiment of the present disclosure. This embodiment provides a virtual image generation method. As shown in FIG. 1, the virtual image generation method according to this embodiment may specifically include the following steps.

In S101, base coefficients corresponding to key points of a target face are acquired based on a target face picture.

In S102, a structure of a virtual image of the target face is generated based on a mapping relationship of spatial alignment between a preset virtual model and a standard model, a base of the standard model and the base coefficients corresponding to the key points of the target face.

In S103, texture filling is performed on the structure of the virtual image based on textures of the target face picture, to obtain the virtual image of the target face.

The virtual image generation method according to this embodiment is performed by a virtual image generation apparatus. The virtual image generation apparatus may be an independent electronic entity or an APP that uses software integration. For example, the virtual image generation apparatus may run on various mobile devices such as mobile phones and tablet computers to generate a virtual image of a target face after receiving any picture of the target face.

The target face picture according to this embodiment may be a two-dimensional picture of a face of any character. In order to effectively generate a virtual image of the character, the target face picture is required to include key points of the target face, such as at least one of a face shape, eyes, a mouth, a nose and eyebrows.

Specifically, key points of the target face picture may be detected, and then the key points of the target face are analyzed by a solver based on detection results, to calculate base coefficients corresponding to the key points of the target face. For example, in a specific implementation, the solver may calculate the base coefficients corresponding to the key points of the target face through a classical face key point re-projection error minimization alignment algorithm and a Perspective-n-Point (PnP) algorithm for realization of a three-dimensional standard model of a face to key points of a face in a target face picture.

The base coefficients corresponding to the key points of the target face in this embodiment are configured to represent weights of contributions of bases corresponding to the key points in the standard model to the key points of the target face. For example, for a key point face shape, it is calculated that a coefficient of a face shape base 1 corresponding to the target face is a, a coefficient of a face shape base 2 is b, and a coefficient of a face shape base 3 is c. It may be considered that the face type of the target face may be obtained based on a*face type base 1+b*face type base 2+c*face type base 3. The principle is the same for other face key points.

The preset virtual model according to this embodiment may be a model designed by a designer, which may be set in a certain style according to requirements of scenarios used or users' personalized requirements. For example, in the virtual model, a character may be set in a style of big eyes and a small mouth, or in a style of big eyes and a big mouth, or in a style of big eyes and a normal mouth, or at least one key point of the face may be adjusted according to a user requirement to make an image of the character in a more exaggerated style.

The standard model according to this embodiment is a model pre-created to show a normal image of a character without any exaggerated style. Based on the pre-created standard model, a face shape base, an eye shape base, an eyebrow base, a nose base, a mouth base and an ear base associated with the standard model may be further pre-created. Further, various expression bases corresponding to the standard model may also be set, which may also be called blendshape bases.

For example, the face shape base may include round face, square face, heart-shaped face, oval face and diamond face bases.

The nose base may include standard nose, curved nose and straight nose bases.

The eye base may include standard eye, vertical eye, phoenix eye, triangular eye, oblique eye, slender eye and round eye bases.

The eyebrow base may include natural eyebrow, straight eyebrow, lanceted eyebrow, arched eyebrow and rising eyebrow bases.

The mouth base may include standard mouth, cherry mouth and large mouth bases.

The ear base may include big ear, small ear and flapping ear bases.

Since all bases of the standard model have been pre-created, in order to make full use of the bases of the standard model, in this embodiment, a structure of a virtual image of the target face may be generated based on a mapping relationship of spatial alignment between a preset virtual model and a standard model, a base of the standard model and the base coefficients corresponding to the key points of the target face.

Finally, textures of the target face picture may be extracted by using a neural network model such as a texture extraction model, and the structure of the virtual image is filled with the textures, to obtain the virtual image of the target face. Alternatively, a neural network model such as a texture filling model may be directly trained, and the target face and the structure of the virtual image may be inputted to the texture filling model. The texture filling model may directly extract textures from the target face and directly fill the structure of the virtual image with the textures to generate and output the virtual image of the target face. The related neural network model may be a neural network model such as an unsupervised generative attentional network (UGATIT) or a cycle generative adversarial network (CycleGAN).

In the virtual image generation method according to this embodiment, the process of acquiring base coefficients corresponding to key points of a target face based on a target face picture is easy to implement, which may be realized by a solver. Moreover, the solver has fewer codes and a light weight and consumes fewer resources in real-time calculation, which may run directly on the side of a terminal device such as a mobile phone, making it very convenient to use. In addition, the solver has strong compatibility with bases of the face key points, is directly available without changing the code when the base is modified, and is highly applicable.

In the virtual image generation method according to this embodiment, a structure of a virtual image of the target face may be generated based on a mapping relationship of spatial alignment between a virtual model and a standard model, a base of the standard model and the base coefficients corresponding to the key points of the target face, and then a virtual image is obtained by texture filling, so as to provide a virtual image generation scheme with a high generation speed, high generation efficiency and low generation costs, which is suitable for generating various styles of virtual images, thereby greatly reducing adaptation costs of the virtual image and improving the industrial efficiency of personalized virtual image generation.

According to the virtual image generation method according to this embodiment, a virtual image generation scheme with a high generation speed, high generation efficiency and low generation costs is provided.

Figure 2:
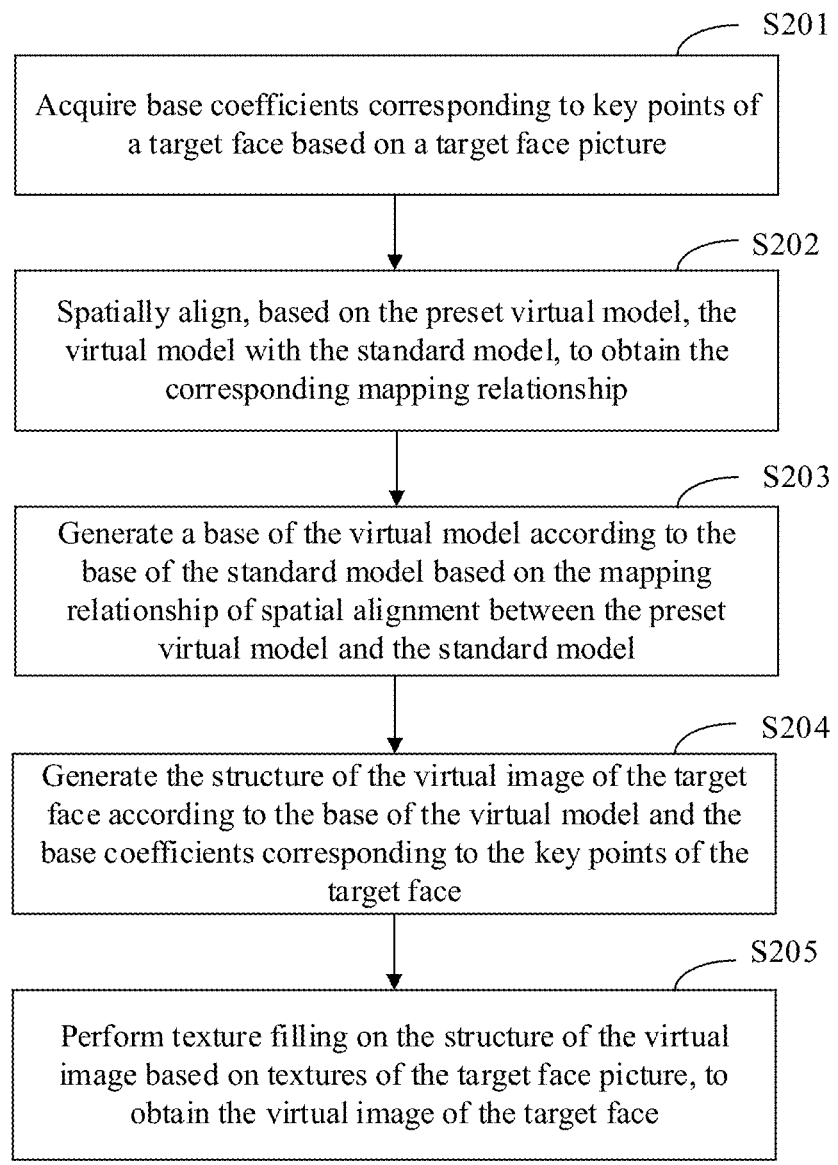
FIG. 2 is a schematic diagram according to a second embodiment of the present disclosure.

FIG. 2 is a schematic diagram according to a second embodiment of the present disclosure. A virtual image generation method according to this embodiment further introduces the technical solution of the present disclosure in more detail based on the technical solution in the embodiment shown in FIG. 1. As shown in FIG. 2, the virtual image generation method according to this embodiment may specifically include the following steps.

In S201, base coefficients corresponding to key points of a target face are acquired based on a target face picture.

In S202, based on the preset virtual model, the virtual model is spatially aligned with the standard model, to obtain the corresponding mapping relationship.

Optionally, no sequential relationship exists between this step and step S201. Ensure that this step is prior to step S203.

In this embodiment, in this step, a virtual image generation apparatus acquires the corresponding mapping relationship based on spatial alignment of a virtual model designed by the designer and the pre-created standard model. In practical applications, this step may also be manually completed by the research and development personnel offline, and may be directly retrieved in use.

In S203, a base of the virtual model is generated according to the base of the standard model based on the mapping relationship of spatial alignment between the preset virtual model and the standard model.

For example, this step may include: generating a face key point base of the virtual model according to a face key point base of the standard model based on the mapping relationship of spatial alignment between the preset virtual model and the standard model; and/or generating an expression base of the virtual model according to an expression base of the standard model based on the mapping relationship of spatial alignment between the preset virtual model and the standard model. That is, in this manner, the face key point base of the virtual model can be generated, and the expression base of the virtual model can also be generated, which has strong compatibility and strong practicability.

In S204, the structure of the virtual image of the target face is generated according to the base of the virtual model and the base coefficients corresponding to the key points of the target face.

Step S203 to step S204 are one implementation of step S102 in the embodiment shown in FIG. 1. In the implementation, firstly, the base of the virtual model is generated based on the mapping relationship between the virtual model and the standard model; then, base coefficients corresponding to key points of the target face are mapped to the virtual model, and are combined with the base of the virtual model to generate the structure of the virtual image of the target face.

Figure 3:
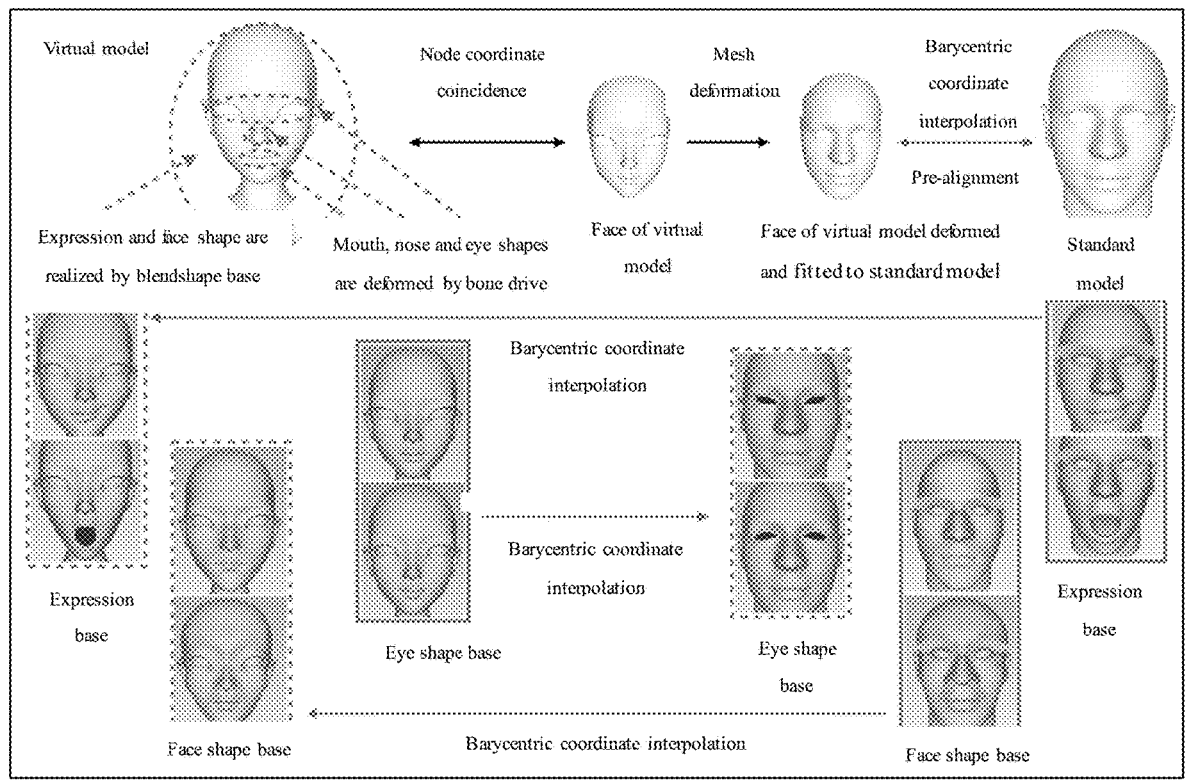
FIG. 3 is a schematic diagram according to a third embodiment of the present disclosure.

For example, FIG. 3 is a schematic diagram according to a third embodiment of the present disclosure. In this embodiment, a process of generating a base of a virtual model is exemplified. In practical applications, an expression and a face shape of a face model may be realized by a blendshape base, and mouth, nose and eye shapes in the model may be deformed by bone drive. As shown in FIG. 3, the virtual model in this embodiment is also similar.

When the virtual model designed by the designer is acquired, the virtual model and the standard model may be spatially aligned according to a manner in the first line of FIG. 3 to obtain the corresponding mapping relationship. For example, specifically, firstly, key points may be extracted by node coordinate coincidence. Next, a mesh is deformed. The topology of the mesh remains unchanged in this process, and the face of the virtual model may be deformed and fitted to the standard model. Then, pre-alignment is performed, and the virtual model is aligned with the standard model by a barycentric coordinate interpolation. A topology relationship of the mesh changes during the alignment. Based on the above operations, the mapping relationship between the virtual model and the standard model may be accurately obtained, and then the virtual image may be accurately generated subsequently based on the mapping relationship.

In the embodiment shown in FIG. 3, for example, an application scenario includes a face shape base, an eye shape base and an expression base, and is based on the mapping relationship between the virtual model and the standard model obtained above. An eye shape base, a face shape base and an expression base of the standard model may be referred to respectively based on the mapping relationship, and an eye shape base, a face shape base and an expression base of the virtual model may be obtained respectively by a barycentric coordinate interpolation. In practical applications, if bases of other face key points are involved, such as an eyebrow base, a mouth base, a nose base and an ear base, an eyebrow base, a mouth base, a nose base and an ear base of the virtual model may also be obtained similarly.

In addition, in practical applications, the structure of the virtual image of the target face may also be generated in other manners. For example, instead of generating the base of the virtual model, contribution shares of the bases corresponding to the key points of the target face to the virtual image of the target face may be generated directly according to the mapping relationship between the virtual model and the standard model, the base of the standard model and the base coefficients corresponding to the key points of the target face. Contribution shares of all the bases corresponding to the key points of the target face to the virtual image of the target face are spliced to obtain virtual images of the key points of the target face. Finally, the virtual images of the key points in the target face are spliced to obtain the structure of the virtual image of the target face. Similarly, the structure of the virtual image may also be generated in other manners based on the base of the standard model, the base coefficients corresponding to the key points of the target face and the mapping relationship of spatial alignment between the virtual model and the standard model, which are not listed herein. In short, no matter which manner is adopted, the base coefficients corresponding to the key points of the target face are mapped to the virtual model, so as to accurately generate the structure of the virtual image.

In S205, texture filling is performed on the structure of the virtual image based on textures of the target face picture, to obtain the virtual image of the target face.

A specific implementation of this step is the same as step S103 in the embodiment shown in FIG. 1, which is used for performing texture filling on the structure of the virtual image to obtain the virtual image of the target face. Refer to the related descriptions in the above embodiment for details, which are not described in detail herein.

In the virtual image generation method according to this embodiment, by use of the above solution, a virtual image generation scheme with a high generation speed, high generation efficiency and low generation costs is provided, and is suitable for generating various styles of virtual images, which greatly reduces adaptation costs of the virtual image and improves the industrial efficiency of personalized virtual image generation.

Figure 4:
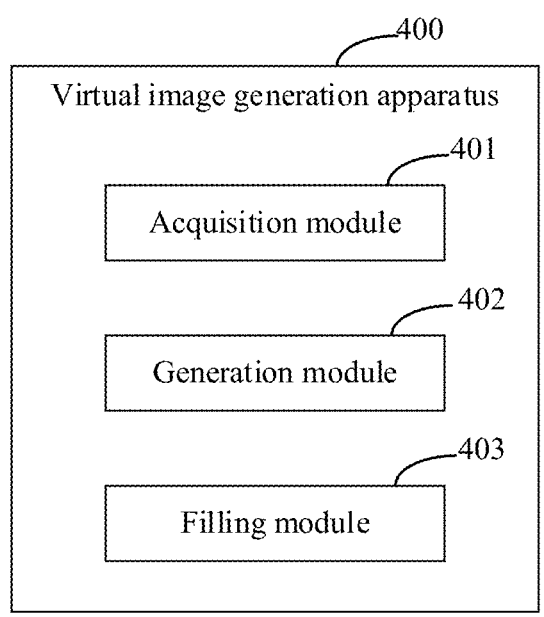
FIG. 4 is a schematic diagram according to a fourth embodiment of the present disclosure.

FIG. 4 is a schematic diagram according to a fourth embodiment of the present disclosure. As shown in FIG. 4, this embodiment provides a virtual image generation apparatus 400, including:

an acquisition module 401 configured to acquire base coefficients corresponding to key points of a target face based on a target face picture;

a generation module 402 configured to generate a structure of a virtual image of the target face based on a mapping relationship of spatial alignment between a preset virtual model and a standard model, a base of the standard model and the base coefficients corresponding to the key points of the target face; and a filling module 403 configured to perform texture filling on the structure of the virtual image based on textures of the target face picture, to obtain the virtual image of the target face.

The implementation principle and the technical effect of generating a virtual image by using the above modules in the virtual image generation apparatus 400 according to this embodiment are the same as those in the above related method embodiment. Refer to the descriptions of the above related method embodiment for details, which are not described in detail herein.

Figure 5:
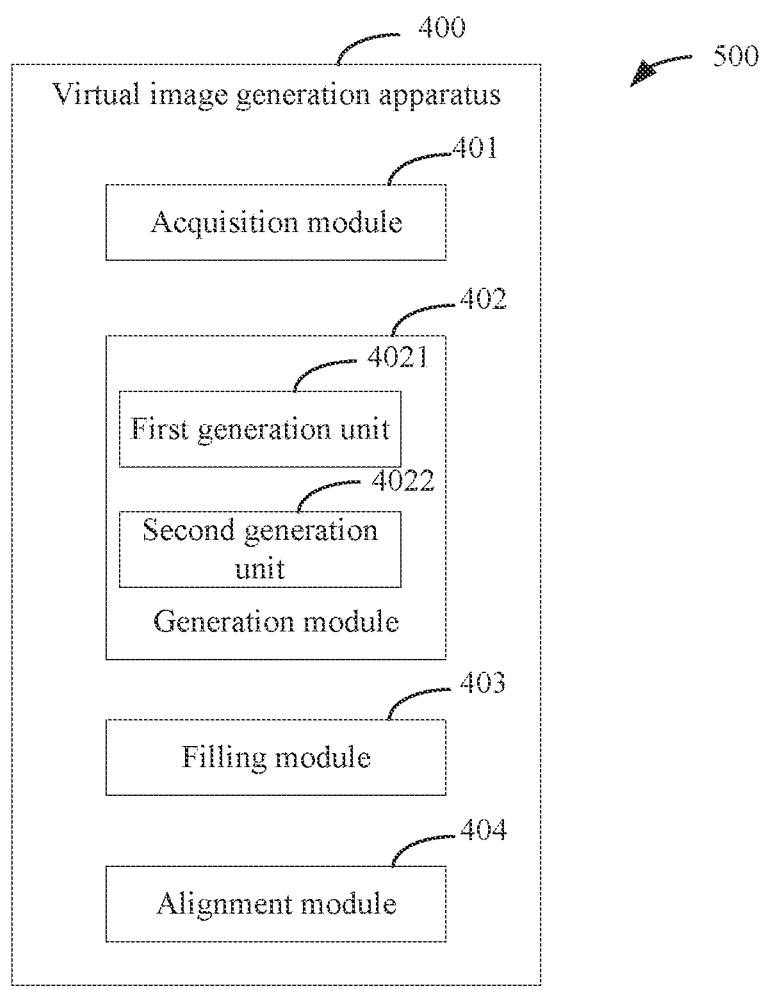
FIG. 5 is a schematic diagram according to a fifth embodiment of the present disclosure.

FIG. 5 is a schematic diagram according to a fifth embodiment of the present disclosure. As shown in FIG. 5, a virtual image generation apparatus 500 according to this embodiment further introduces the technical solution of the present disclosure in more detail based on the technical solution in the embodiment shown in FIG. 4.

As shown in FIG. 5, in the virtual image generation apparatus 500 according to this embodiment, the generation module 402 includes:

a first generation unit 4021 configured to generate a base of the virtual model according to the base of the standard model based on the mapping relationship of spatial alignment between the preset virtual model and the standard model; and a second generation unit 4022 configured to generate the structure of the virtual image of the target face according to the base of the virtual model and the base coefficients corresponding to the key points of the target face.

Further optionally, in the virtual image generation apparatus 500 according to this embodiment, the first generation unit 4021 is configured to:

generate a face key point base of the virtual model according to a face key point base of the standard model based on the mapping relationship of spatial alignment between the preset virtual model and the standard model; and/or generate an expression base of the virtual model according to an expression base of the standard model based on the mapping relationship of spatial alignment between the preset virtual model and the standard model.

Further optionally, as shown in FIG. 5, the virtual image generation apparatus 500 according to this embodiment further includes:

an alignment module 404 configured to spatially align, based on the preset virtual model, the virtual model with the standard model, to obtain the corresponding mapping relationship.

Further optionally, the filling module 403 is configured to:

extract the textures of the target face picture by using a pre-trained texture extraction model; and fill the structure of the virtual image with the extracted textures of the target face picture, to obtain the virtual image of the target face.

The implementation principle and the technical effect of generating a virtual image by using the above modules in the virtual image generation apparatus 400 according to this embodiment are the same as those in the above related method embodiment. Refer to the descriptions of the above related method embodiment for details, which are not described in detail herein.

Acquisition, storage and application of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 6:
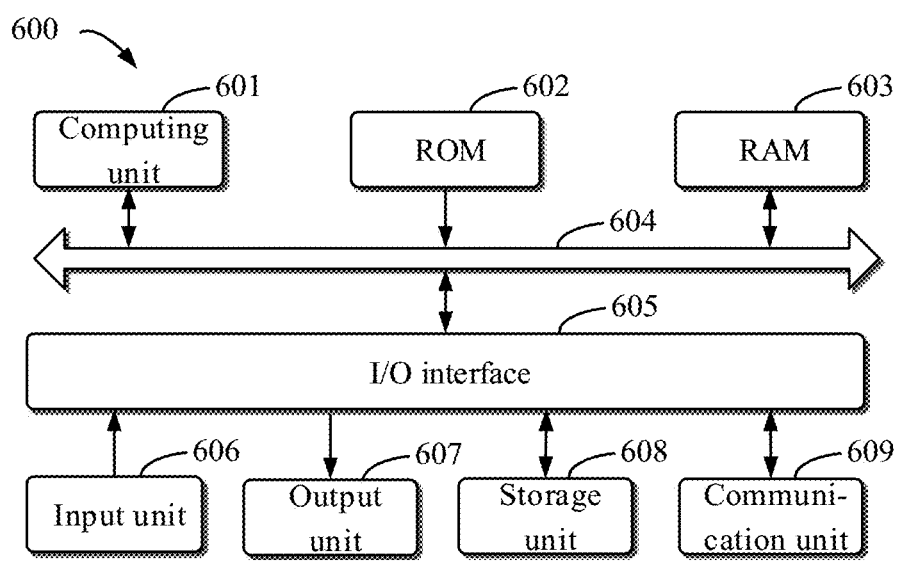
FIG. 6 is a block diagram of an electronic device configured to perform a virtual image generation method according to an embodiment of the present disclosure.

FIG. 6 is a schematic block diagram of an exemplary electronic device 600 configured to implement embodiments of the present disclosure. The electronic device is intended to represent various forms of digital computers, such as laptops, desktops, workbenches, PDAs, servers, blade servers, mainframe computers and other suitable computing devices. The electronic device may further represent various forms of mobile devices, such as PDAs, cellular phones, smart phones, wearable devices and other similar computing devices. The components, their connections and relationships, and their functions shown herein are examples only, and are not intended to limit the implementation of the present disclosure as described and/or required herein.

As shown in FIG. 6, the device 600 includes a computing unit 601, which may perform various suitable actions and processing according to a computer program stored in a read-only memory (ROM) 602 or a computer program loaded from a storage unit 608 into a random access memory (RAM) 603. The RAM 603 may also store various programs and data required to operate the device 600. The computing unit 601, the ROM 602 and the RAM 603 are connected to one another by a bus 604. An input/output (I/O) interface 605 is also connected to the bus 604.

A plurality of components in the device 600 are connected to the I/O interface 605, including an input unit 606, such as a keyboard and a mouse; an output unit 607, such as various displays and speakers; a storage unit 608, such as disks and discs; and a communication unit 609, such as a network card, a modem and a wireless communication transceiver. The communication unit 609 allows the device 600 to exchange information/data with other devices over computer networks such as the Internet and/or various telecommunications networks.

The computing unit 601 may be a variety of general-purpose and/or special-purpose processing components with processing and computing capabilities. Some examples of the computing unit 601 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 601 performs the methods and processing described above, such as the virtual image generation method. For example, in some embodiments, the virtual image generation method may be implemented as a computer software program that is tangibly embodied in a machine-readable medium, such as the storage unit 608. In some embodiments, part or all of a computer program may be loaded and/or installed on the device 600 via the ROM 602 and/or the communication unit 609. One or more steps of the virtual image generation method described above may be performed when the computer program is loaded into the RAM 603 and executed by the computing unit 601. Alternatively, in other embodiments, the computing unit 601 may be configured to perform the virtual image generation method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented virtual image generation method, wherein the method comprises:
   acquiring base coefficients corresponding to key points of a target face based on a target face picture;
   generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face; and displaying the obtained virtual image of the target face on a terminal device.

2. The method according to claim 1, wherein the step of generating a structure of a virtual image of the target face based on a mapping relationship of spatial alignment between a preset virtual model and a standard model, a base of the standard model and the base coefficients corresponding to the key points of the target face comprises:

generating a base of the preset virtual model according to the base of the standard model based on the mapping relationship of spatial alignment between the preset virtual model and the standard model; and generating the structure of the virtual image of the target face according to the base of the preset virtual model and the base coefficients corresponding to the key points of the target face.

3. The method according to claim 2, wherein the step of generating a base of the preset virtual model according to the base of the standard model based on the mapping relationship of spatial alignment between the preset virtual model and the standard model comprises:

generating a face key point base of the preset virtual model according to a face key point base of the standard model based on the mapping relationship of spatial alignment between the preset virtual model and the standard model; and generating an expression base of the preset virtual model according to an expression base of the standard model based on the mapping relationship of spatial alignment between the preset virtual model and the standard model.

4. The method according to claim 3, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

5. The method according to claim 3, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

6. The method according to claim 2, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

7. The method according to claim 2, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

8. The method according to claim 1, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

9. The method according to claim 8, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

10. The method according to claim 1, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

11. An electronic device, comprising:

at least one processor; and a memory communicatively connected with the at least one processor;

wherein the memory stores instructions executable by the at least one processor, and the instructions are executed by the at least one processor to enable the at least one processor to perform a virtual image generation method, wherein the virtual image generation method comprises:

acquiring base coefficients corresponding to key points of a target face based on a target face picture;

generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face; and displaying the obtained virtual image of the target face on a terminal device.

12. The electronic device according to claim 11, wherein the step of generating a structure of a virtual image of the target face based on a mapping relationship of spatial alignment between a preset virtual model and a standard model, a base of the standard model and the base coefficients corresponding to the key points of the target face comprises:

generating a base of the preset virtual model according to the base of the standard model based on the mapping relationship of spatial alignment between the preset virtual model and the standard model; and generating the structure of the virtual image of the target face according to the base of the preset virtual model and the base coefficients corresponding to the key points of the target face.

13. The electronic device according to claim 12, wherein the step of generating a base of the preset virtual model according to the base of the standard model based on the mapping relationship of spatial alignment between the preset virtual model and the standard model comprises:

generating a face key point base of the preset virtual model according to a face key point base of the standard model based on the mapping relationship of spatial alignment between the preset virtual model and the standard model; and generating an expression base of the preset virtual model according to an expression base of the standard model based on the mapping relationship of spatial alignment between the preset virtual model and the standard model.

14. The electronic device according to claim 13, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

15. The electronic device according to claim 13, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

16. The electronic device according to claim 12, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

17. The electronic device according to claim 12, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

18. The electronic device according to claim 11, wherein, prior to the step of generating a structure of a virtual image of the target face based on a mapping relationship of spatial alignment between a preset virtual model and a standard model, a base of the standard model and the base coefficients corresponding to the key points of the target face, the method further comprises:

spatially aligning, based on the preset virtual model, the preset virtual model with the standard model, to obtain the corresponding mapping relationship.

19. The electronic device according to claim 11, wherein the step of performing texture filling on the structure of the virtual image based on textures of the target face picture, to obtain the virtual image of the target face comprises:

extracting the textures of the target face picture by using a pre-trained texture extraction model; and filling the structure of the virtual image with the extracted textures of the target face picture, to obtain the virtual image of the target face.

20. A non-transitory computer readable storage medium with computer instructions stored thereon, wherein the computer instructions are used for causing a computer to perform a virtual image generation method, wherein the virtual image generation method comprises:

acquiring base coefficients corresponding to key points of a target face based on a target face picture;

generating a structure of a virtual image of the target face based on a mapping relationship of spatial alignment between a preset virtual model and a standard model, a base of the standard model and the base coefficients corresponding to the key points of the target face; and performing texture filling on the structure of the virtual image based on textures of the target face picture, to obtain the virtual image of the target face; and displaying the obtained virtual image of the target face on a terminal device.

* * * * *